Nov. 21, 1967   P. D. COREY ET AL   3,354,376
MASTER-SLAVE INVERTER VOLTAGE REGULATOR
Filed Dec. 11, 1964

INVENTOR.
PHILIP D. COREY
LOREN H. WALKER
ARMISTEAD L. WELLFORD
BY
THEIR ATTORNEY

INVENTOR.
PHILIP D. COREY
LOREN H. WALKER
ARMISTEAD L. WELLFORD
BY James G. Williams
THEIR ATTORNEY INVENTOR.
PHILIP D. COREY
LOREN H. WALKER
ARMISTEAD L. WELLFORD
BY
THEIR ATTORNEY United States Patent Office 3,354,376
Patented Nov. 21, 1967

3,354,376
MASTER-SLAVE INVERTER VOLTAGE
REGULATOR
Philip D. Corey, Crozet, and Loren H. Walker and Armistead L. Wellford, Waynesboro, Va., assignors to General Electric Company, a corporation of New York
Filed Dec. 11, 1964, Ser. No. 417,610
4 Claims. (Cl. 321—5)

ABSTRACT OF THE DISCLOSURE

The invention is a voltage regulator for a multiphase inverter. The voltage between phases is monitored and the deviation from a reference voltage is used to control the phase shift between inverters and the amplitude of the inverter output by controlling the phase shift between the master and slave multivibrators which make up each inverter.

The invention relates to a regulating circuit, and particularly to a regulating circuit for maintaining balanced conditions in a multiphase alternating current system that is supplied from inverters.

Inverters, particularly static inverters, are frequently used to change direct current power to multiphase alternating current power. It is desirable that the inverters be simple and economic, and at the same time provide all desired functions. In previous systems, two single phase inverters have been used with a Scott-T type of connection to provide three phase alternating current power. However, it has been difficult to regulate and to maintain a balanced output in such a system unless the system is large from a power rating standpoint so as to maintain the desired characteristics under the conditions which will exist. Such a large system is generally heavier and more expensive than would be required if means were devised to regulate and balance the output of a Scott-T system, thereby correcting for the effects of load level changes and unsymmetrical loads.

Accordingly, an object of the invention is to provide an improved regulating circuit.

Another object of the invention is to provide an improved regulating circuit for two inverters which are used to produce three phase alternating current power.

Another object of the invention is to provide a system that has two single phase inverters, each having a master and slave oscillator, to produce three phase alternating current power, and that regulates the three phases by controlling the amplitude and phase relation of the outputs of the two inverters.

Briefly, these and other objects are achieved in accordance with the invention by circuits that sense the voltage amplitudes between the three phases. Two of the sensed voltage amplitudes are used to control the amplitudes of the outputs of two single phase inverters respectively, and the other sensed voltage amplitude is used to control the relative phase relation of the outputs of the two inverters. With the amplitudes and phase relation of the two inverters so controlled, the three phases of alternating current power may be regulated and balanced over a wide range of load conditions.

The invention is particularly pointed out in the claims. The invention may be better understood from the following description given in connection with the accompanying drawing, in which:

Introduction

Figure 1:
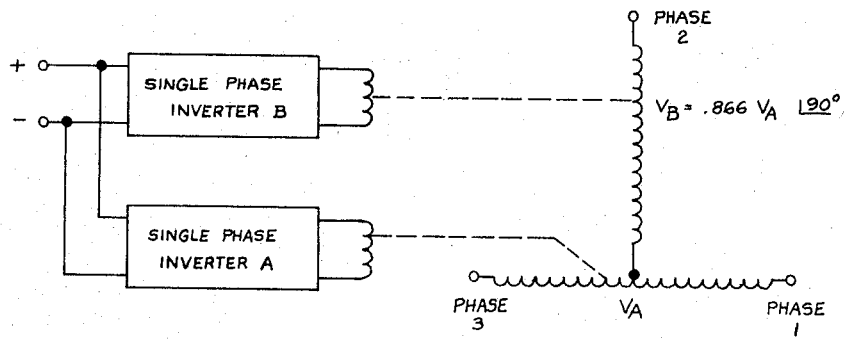
FIGURE 1 shows a diagram, partly in block form, of two inverters and a Scott-T connection to provide three phase alternating current power.
Figure 2:
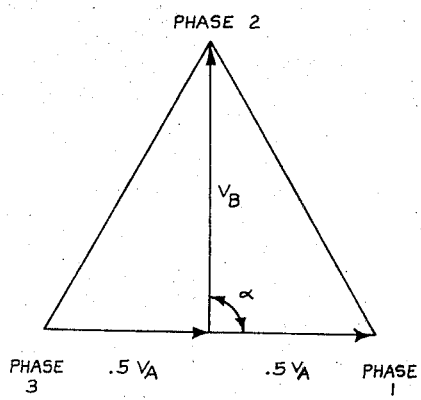
FIGURE 2 shows a vector diagram for explaining the voltage and phase relationships of the diagram of FIGURE 1.

FIGURE 1 shows two single phase inverters A and B which are supplied with direct current and which produce two alternating current voltages. The voltage of the inverter A is coupled to a center tapped winding of a known Scott-T transformer or connection to provide a voltage $V_A$. The voltage of the inverter B is coupled to the other winding of the Scott-T transformer or connection to provide a voltage $V_B$ which has an amplitude of 0.866 the amplitude of the voltage $V_A$ and leads or lags the voltage of $V_A$ by 90 degrees. As shown in FIGURE 2, these voltages have a vector diagram or relation such that three alternating current phases are provided. The voltages between the phases have equal amplitudes and equal phase relations of 120 degrees. In FIGURE 2, the phase relation of the voltage $V_B$ with respect to the voltage $V_A$ is indicated by the angle $\alpha$. The phase terminals provide a delta connection. If a Y connection is desired, a tap on the winding providing the voltage $V_B$ can be made at the appropriate neutral point.

Figure 3:
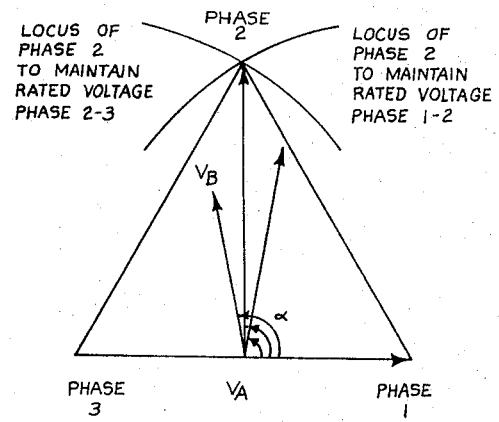
FIGURES 3 and 4 show vector diagrams for explaining the operation of the invention as used with the inverters of FIGURE 1.

FIGURE 3 shows a vector diagram illustrating how the outputs of the two inverters may be regulated in accordance with the invention to regulate the three phases. As seen in FIGURE 3, the three variables to be controlled are the phase-to-phase output voltages. There are three variables which can be controlled, and they are the amplitudes of the two inverter voltages $V_A$ and $V_B$, and the phase relation or angle $\alpha$ between them. The voltage amplitude between phase 1 and phase 3 may be regulated by varying the amplitude of $V_A$. The voltage amplitude between phase 2 and phase 3 may be regulated by varying the amplitude of $V_B$. However, to maintain, for example, the amplitude of the voltage between phase 2 and phase 3 constant for varying $\alpha$, $V_B$ must change accordingly. For all values of the angle $\alpha$ reasonably close to 90 degrees, there is an amplitude of $V_B$ which will cause the voltage amplitude between phase 2 and phase 3 to be at its rated value, and an increase in the amplitude of $V_B$ will cause an increase in the voltage amplitude between phase 2 and phase 3. The amplitude of voltage between phase 1 and phase 2 may be regulated by varying the angle $\alpha$. If the amplitude of the voltage between phase 1 and phase 2 is too low, the angle $\alpha$ may be increased to rotate the vector for the voltage $V_B$ counterclockwise. If the amplitude of the voltage between phase 1 and phase 2 is too high, the angle $\alpha$ may be decreased to rotate the vector for the voltage $V_B$ clockwise.

The locus of phase 2 which is needed to maintain the rated voltage amplitude between phase 2 and phase 3 and the locus of phase 2 which is needed to maintain the rated voltage between phase 1 and phase 2 are shown in FIGURE 3. These loci cross at one point, namely when the angle $\alpha$ equals 90 degress. Thus, a regulating circuit which operates on the voltages $V_A$ and $V_B$ in this manner will maintain the amplitudes between the three phases at the rated value.

Figure 4:
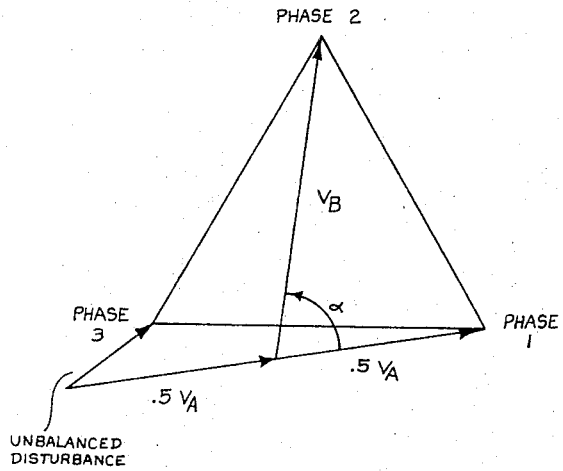

In accordance with the invention, any unbalance or disturbance on any one or all of the phases displaces or changes the voltages $V_A$ and $V_B$ to correct the disturbance or unbalance. As shown in FIGURE 4, if there is an additional load or unbalance on phase 3, the voltages $V_A$ and $V_B$ increase in amplitude and the angle $\alpha$ is decreased below 90 degrees to accommodate this unbalance and maintain equal voltage amplitudes between the three phases.

*Circuit description*

Figure 5A:
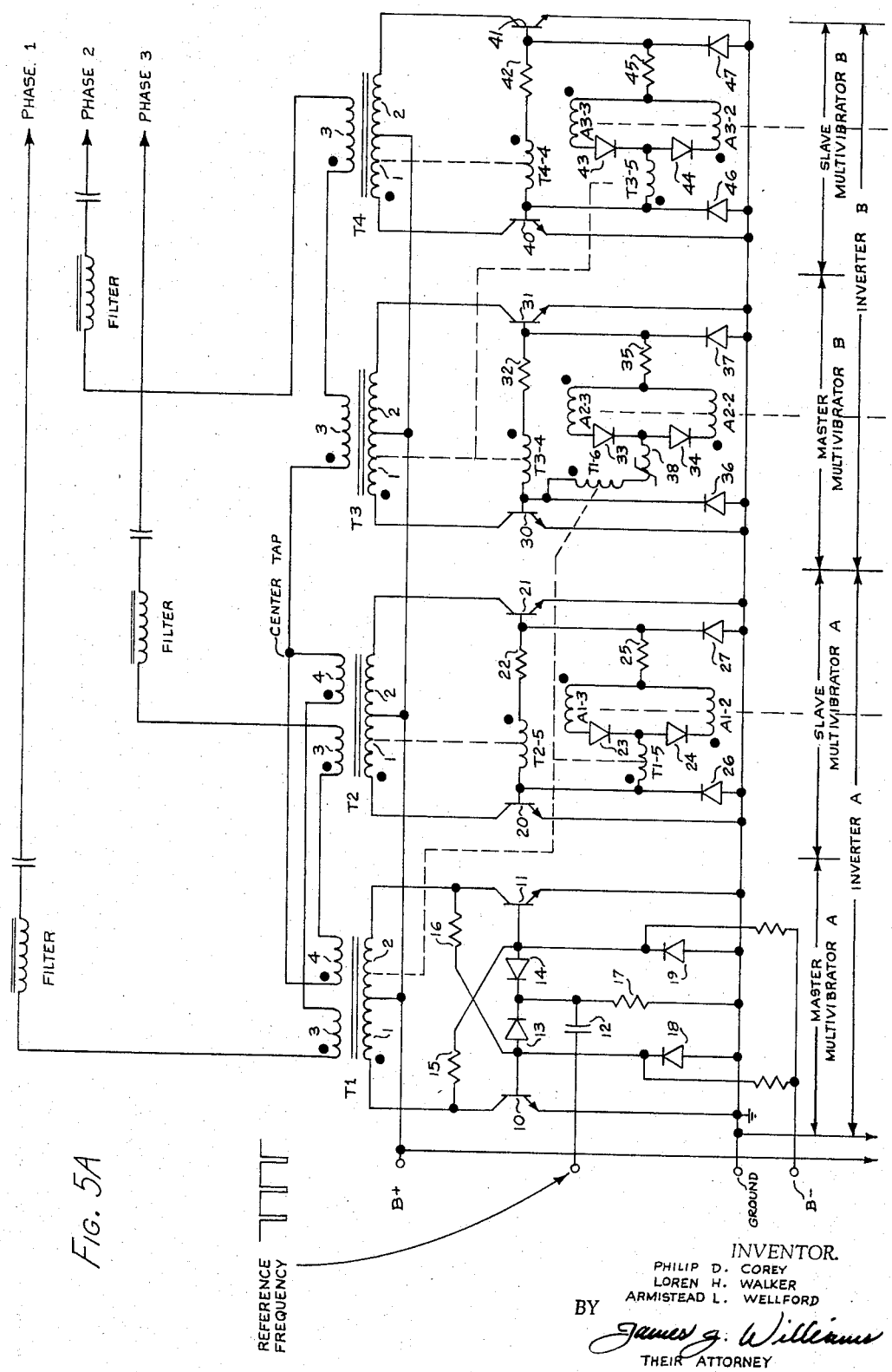
FIGURES 5A and 5B show a schematic diagram of two single phase inverters for producing three phase alternating current power and the regulating circuit of the invention as used with these inverters.
Figure 5B:
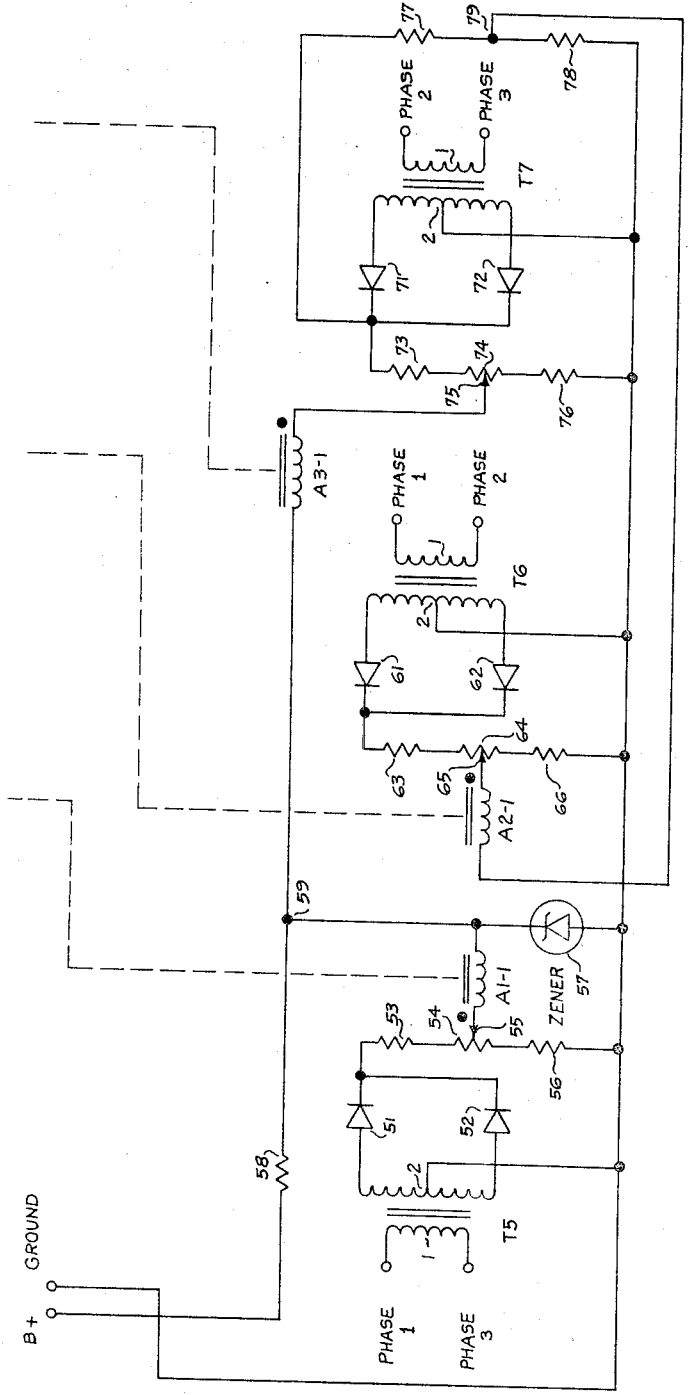

FIGURES 5A and 5B show a circuit diagram of a system with two inverters and a Scott-T transformer or connection for producing a three phase alternating current output. FIGURES 5A and 5B also show a regulating circuit in accordance with the invention. The FIGURES 5A and 5B are to be considered connected to the B+ terminal and the ground bus, and magnetically coupled together as indicated by the dashed lines extending downward in FIGURE 5A and upward in FIGURE 5B. In FIGURE 5A, various transformers are indicated by the letter T followed by a number indicating the transformer number, and this is followed by a hyphen and number indicating the winding number of the transformer. The windings which are coupled together are further indicated by dashed lines. Thus, the transformer T1 comprises six windings, four windings being in the master multivibrator A, a fifth winding T1-5 being in the slave multivibrator A, and a sixth winding T1-6 being in the master multivibrator B. Also in FIGURES 5A and 5B, magnetic amplifiers are indicated by the letter A followed by a number indicating the magnetic amplifier number, and this is followed by a hyphen and the number indicating the winding number of the magnetic amplifier. Also in FIGURES 5A and 5B, each of the windings is provided with the conventional dot polarity. In accordance with this convention, a voltage polarity applied to the dotted end of a given winding causes the same polarity to appear at all dotted ends of all windings associated with the given winding.

In FIGURES 5A and 5B, it has been assumed that the system is intended to produce three phase, 400 cycle alternating current from direct current supplied between a B+ terminal and a ground bus. The system includes two inverters A and B. The inverter A comprises a master multivibrator A and a slave multivibrator A, and the inverter B also comprises a master multivibrator B and a slave multivibrator B. The master multivibrator A is supplied with a reference frequency which, for the assumed example, would be negative-going pulses at an 800 cycle rate. These pulses are applied through a capacitor 12 and through diode rectifiers 13, 14 to the respective bases of NPN type transistors 10, 11. The transistors 10, 11 are connected in conventional bistable multivibrator fashion with resistors 15, 16 intercoupling their bases and collectors. The collectors of the transistors 10, 11 are respectively coupled to opposite ends of the windings T1-1, T1-2. These windings T1-1, T1-2 are connected to the B+ terminal at their common point. The bases of the transistors 10, 11 are respectively coupled through diode rectifiers 18, 19 to the ground bus, and are coupled through respective resistors to a source of direct current potential B— that is negative with respect to the ground bus. A resistors 17 is also coupled between the capacitor 12 and the ground bus. The emitters are coupled to the ground bus. The master multivibrator A is arranged so that when a negative-going pulse is applied, the transistor that is conducting is cut off and the current flow through the associated winding T1-1 or T1-2 causes the collector voltage of the conducting transistor to increase. This increased voltage is coupled through one of the resistors 15, 16 to cause the other transistor to be turned on.

The slave multivibrator A also comprises two NPN type transistors 20, 21 having their collectors coupled to the windings T2-1, T2-2. These windings T2-1, T2-2 are connected to the B+ terminal at their common point. The bases of the transistors 20, 21 are coupled together through a winding T2-5 and a resistor 22, and also through a winding T1-5, the parallel circuit comprising diode rectifiers 23, 24 and windings A1-2, A1-3, and a resistor 25. The slave multivibrator A is switched from one condition with one transistor conducting to the other condition with the other transistor conducting by the winding T1-5 which is coupled to the transformer T1 in the master multivibrator A. For example, if the transistor 11 in the master multivibrator A is conducting, current is flowing from the dotted end to the undotted end of the winding T1-2. The dotted end of the winding T1-5 is therefore positive and this causes current to flow from this dotted end through the base-emitter path of the transistor 20, the diode rectifier 27, the resistor 25, the winding A1-3, and the diode rectifier 23 back to the undotted end. This current is, at first, limited to some exciting current because of the previously reset condition of the magnetic amplifier A1. However, when the amplifier A1 becomes saturated in the set condition, sufficient current may then flow to cause the transistor 20 to conduct. When the transistor 20 conducts, current flows from the undotted end toward the dotted end of the winding T2-1 which provides regenerative or reinforcing action through the winding T2-5. Thus, the transistor 20 is quickly turned on and the transistor 21 is quickly turned off after some predetermined time determined by the previous condition of the magnetic amplifier A1. When another negative pulse is applied to the master multivibrator A to turn the transistor 11 off and the transistor 10 on, current in the transformer T1 reverses and flows from the undotted toward the dotted end of the winding T1-1. Subsequently, the transistor 21 is turned on by a current which flows from the undotted end of the winding T1-5 through the diode rectifier 24, the winding A1-2, the resistor 25, the base-emitter path of the transistor 21, and the diode rectifier 26 back to the dotted end of the winding T1-5. This also turns the transistor 20 off.

The inverter B is similar to the inverter A, and comprises a master multivibrator B and a slave multivibrator B. The master multivibrator B is coupled to and controlled by the master multivibrator A through the winding T1-6. The major difference between the master multivibrator B and the slave multivibrator A is that a saturable reactor 38 is coupled between the winding T1-6 and the parallel circuit comprising the diode rectifiers 33, 34 and the magnetic amplifier windings A2-2, A2-3. This saturable reactor 38 introduces a further volt-second time delay, which preferably is equivalent to 60 degrees at the output frequency, which in the assumed example is 400 cycles.

The slave multivibrator B is coupled to the master multivibrator B through the winding T3-5 in a manner similar to the coupling between the slave multivibrator A and the master multivibrator A.

The multivibrator circuits in the inverters are known in the art. Further, the regenerative windings T2-5, T3-4, T4-4 are known in the art, and provide a regenerating or reinforcing action to cause the multivibrators to switch conditions quickly. The invention provides the added circuits between the bases of transistors in each of the multivibrator circuits. In the slave multivibrator A, the regulating circuit added in accordance with the invention comprises the winding T1-5, the parallel circuit including the diode rectifiers 23, 24, and the windings A1-2, A1-3, and the resistor 25. In the master multivibrator B, the regulating circuit added in accordance with the invention comprises the winding T1-6, the saturable reactor 38, the parallel circuit including the diode rectifiers 33, 34 and the windings A2-2, A2-3, and the resistor 35. And in the slave multivibrator B, the regulating circuit added in accordance with the invention comprises the winding T3-5, the parallel circuit including the diode rectifiers 43, 44 and the windings A3-2, A3-3, and the resistor 45. The magnetic amplifier windings of these circuits are coupled, as indicated by the dashed line, to respective windings in the magnetic amplifiers shown in FIGURE 5B. But before FIGURE 5B is discussed, the output circuit for the inverter A and the inverter B will be described.

As indicated previously, the Scott-T connection comprises a center tapped winding for producing the voltage $V_A$ and a second winding for producing the voltage $V_B$. The voltage $V_A$ is provided by windings associated with the transformers T1 and T2. The dotted end of the winding T1–3 provides phase 1 of the output. The winding T1–3 is coupled in series with the winding T2–4 to produce a voltage .5 $V_A$. The undotted end of the winding T2–4 serves as the center tap. This center tap is coupled to winding T1–4 which in turn is coupled to winding T2–3 to produce a voltage .5 $V_A$. The undotted end of winding T2–3 provides phase 3 of the output. The center tap is coupled to the winding T3–3 which in turn is coupled to the winding T4–3 to produce a voltage $V_B$ that is .866 $V_A$ at an angle $\alpha$. The undotted end of winding T4–3 provides phase 2 of the output. The three phase outputs may be and are preferably filtered by a series resonant LC circuit which is preferably tuned to the fundamental frequency, namely 400 cycles in the example. Further filtering and refinement may be added at the phase outputs if desired, such as harmonic suppressing capacitors coupled between the phases. However, these refinements are known to persons skilled in the art.

With reference to FIGURE 5B, the ground bus and the B+ terminal from FIGURE 5A are provided for FIGURE 5B. In FIGURE 5B, three transformers T5, T6, T7 are shown. The primary winding T5–1 is coupled between phase 1 and phase 3. The secondary winding T5–2 has its center tap connected to the ground bus. The output of the secondary winding T5–2 is rectified by rectifiers 51, 52 and supplied to a voltage divider comprising the resistors 53, 54, 56. The resistor 54 has a movable tap 55 which is coupled to the dotted end of the magnetic amplifier winding A1–1. The terminal B+ is coupled through a voltage dropping resistor 58 to a reference potential bus 59. The bus 59 is coupled through a Zener diode 57 to the ground bus to provide a voltage reference. This voltage reference is compared in the magnetic amplifier winding A1–1 with the voltage on the tap 55, the magnitude of this voltage indicating the voltage amplitude between phase 1 and phase 3. In a similar manner, the magnetic amplifier winding A3–1 compares the voltage on the voltage reference bus 59 with the voltage on a tap 75 which (by means of a circuit similar to the one described) has a voltage magnitude indicative of the voltage amplitude between phase 2 and phase 3. A voltage divider comprising resistors 77, 78 is coupled to the rectified output of the transformer T7. The junction 79 of these resistors 77, 78 is coupled to the magnetic amplifier winding A2–1. This winding A2–1 compares the voltage at junction 79 (which indicates the voltage amplitude between phase 2 and phase 3) with the voltage on the tap 65 (which indicates the voltage amplitude between phase 1 and phase 2).

It will thus be seen that the magnetic amplifier winding A1–1 compares the voltage amplitude between phase 1 and phase 3 with a reference. The magnetic amplifier winding A2–1 compares the voltage amplitude between phase 1 and phase 2 with the voltage amplitude between phase 2 and phase 3. And, the magnetic amplifier winding A3–1 compares the voltage amplitude between phase 2 and phase 3 with a reference. It should be noted that the magnetic amplifier winding A2–1 may compare the voltage amplitude between phase 1 and phase 2 with the reference on the bus 59 instead of with the voltage amplitude between phase 2 and phase 3. This may be accomplished by connecting the undotted end of the winding A2–1 to the reference bus 59 instead of to the junction 79 as shown. Also, different or separate reference voltages may be used for each comparison.

*Circuit operation*

Figure 6:
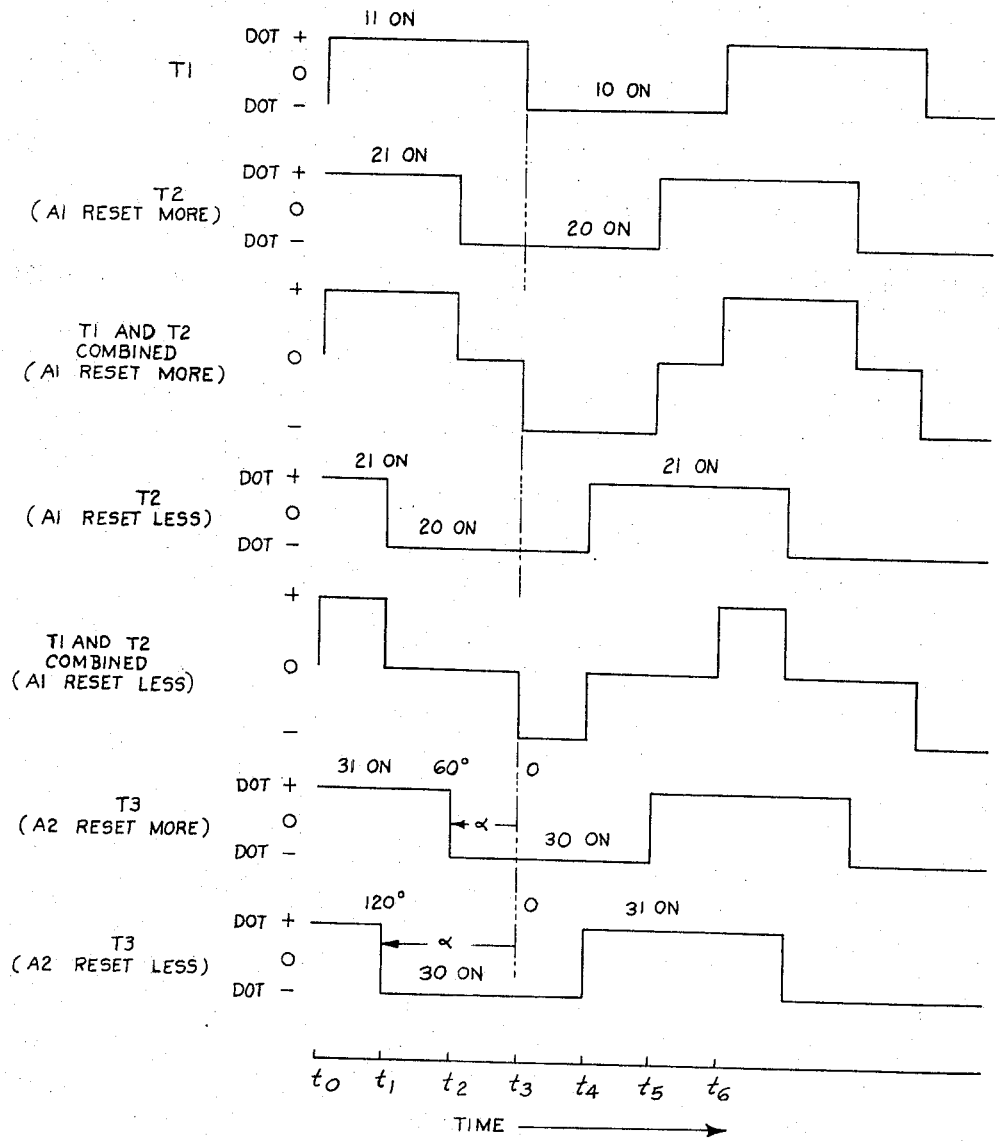
FIGURE 6 shows waveforms for explaining the operation of the invention.

The operation of the regulating circuit of the invention, one embodiment of which is shown in FIGURES 5A and 5B, will be described in connection with the waveforms shown in FIGURE 6. The waveforms of FIGURE 6 are plotted against time. The first or top waveform shows when the dotted end of the windings of the transformer T1 are positive and negative. Initially, it has been assumed that the transistor 11 has just turned on at the time $t_0$. The dotted ends of the windings of the transformer T1 are therefore positive. With the dotted end of the winding T1–5 in the slave multivibrator A positive, current flows from the dotted end of the winding T1–5 through the base-emitter path of the transistor 20, the diode rectifier 27, the resistor 25, the magnetic amplifier winding A1–3, and the diode rectifier 23 back to the undotted end. At a time depending upon the degree to which the magnetic amplifier A1 was reset, this current will set the magnetic amplifier A1 and permit sufficient current to flow so as to cause the transistor 20 to conduct. As seen in the second waveform showing the transformer T2, if the magnetic amplifier A1 has been reset more, this switching occurs at the time $t_2$ and the transistor 20 is turned on and the transistor 21 is turned off. At the time $t_3$, the master multivibrator A is switched again so that the transistor 10 is turned on and the transistor 11 is turned off. This is followed at the time $t_5$ by the slave multivibrator A switching so that the transistor 21 is turned on and the transistor 20 is turned off. The cycle begin to repeat itself at the time $t_6$. The combined outputs of the transformers T1 and T2 are indicated in the third waveform, and it will be seen that this combined output is a quasi square wave which, when filtered, would have a relatively high amplitude. As seen in the fourth waveform, showing the transformer T2 when the magnetic amplifier A1 has been reset less, the transistor 20 turns on at an earlier time $t_1$, since less volt-seconds are required to turn transistor 20 on. In this case, the combined output of the transformers T1 and T2 shown in the fifth waveform, will, after being filtered, have a relatively low amplitude. If the magnetic amplifier A1 is reset more by a large current from the undotted end to the dotted end of the winding A1–1, a greater amplitude output is produced. If the magnetic amplifier A1 is reset less by a small current from the undotted end to the dotted end of the winding A1–1, a lower amplitude output is produced. This is the condition desired for comparing the voltage between phase 1 and phase 3 with a reference because more resetting of the magnetic amplifier A1 and more output occur when the voltage between phase 1 and phase 3 is considerably less than the reference voltage; and less resetting of the magnetic amplifier A1 and less output occur when the voltage between phase 1 and phase 3 is only slightly less than the reference voltage.

No waveforms are shown for the transformers T3 and T4 and their combined outputs, but such waveforms would be similar to the waveforms shown for the transformers T1 and T2, but would occur at different times.

The sixth and seventh waveforms of FIGURE 6 show the relations for the transformer T3 with respect to the transformer T1. As mentioned above, the saturable reactor 38 in the master multivibrator B has a predetermined volt-second characteristic which is equivalent to approximately 60 degrees at the fundamental output frequency of the system. If the magnetic amplifier A2 is reset more or a maximum amount, the maximum time is required for the transistor 30 to be switched on. For example, again assume that at the time $t_0$ the transformer T1 has switched so that its doted end is positive and the transistor 11 is conducting. The transformer winding T1–6 causes current to flow from its dotted end through the base-emitter path of the transistor 30, the diode rectifier 37, the resistor 35, the winding A2–3, the diode rectifier 33, and the saturable reactor 38 back to the undotted end. At the time $t_2$, this current causes the magnetic amplifier A2 to become set again and switches transistor 30 on and the transistor 31 off as shown in the sixth waveform. If the magnetic amplifier A2 is reset less, then the transistor 30 is switched on at an earlier time $t_1$ as shown in the seventh waveform. The sixth and seventh waveforms show that the angle $\alpha$ can be varied between 60 and 120 degrees, this being a reasonable and assumed value. Greater variations are obtainable, but it is believed that circuit values and this range of angles represent a good compromise for various operating conditions. It will thus be seen that the angle $\alpha$ is relatively small when the magnetic amplifier A2 is reset more, which it would be when the voltage between phase 2 and phase 3 is greater than the voltage between phase 1 and phase 2. And, the magnetic amplifier A2 would be reset less and the angle $\alpha$ would be greater when the voltage between phase 2 and phase 3 is only slightly less than the voltage between phase 1 and phase 2.

Conclusion

It will thus be seen that the invention provides an improved regulating circuit for providing balanced outputs in a three phase system provided with alternating current by two inverters. Thus, the invention permits a three phase system to be regulated with only eight switching devices or transistors as compared with twelve required in previous prior art systems. Likewise, individual phase voltages may be regulated so that the three phase system has a balanced output condition. The variable taps associated with the magnetic amplifiers in FIGURE 5B permit adjustment without requiring accurately built windings and volt-second characteristics. And finally, the invention provides a balanced three phase output without requiring a stiff or large power supply.

Various modifications of the invention will occur to persons skilled in the art. For example, the regulating circuit may be used in an N phase system, where N is any integer that is greater than two (i.e., three or greater). As already mentioned, the magnetic amplifier for the phase correction may compare its phase voltages against a reference instead of comparing this amplitude against other phase voltages. And all comparisons may be made against any suitable voltage, such as from some external source, from one of the other phases, or from a reference as shown. The output transformers may be coupled to a further power inverter, such as one utilizing controlled rectifiers, instead of being coupled directly to the output as shown. Therefore, while the invention has been described with reference to a particular embodiment, it is to be understood that modifications may be made without departing from the spirit of the invention or from the scope of the claims.

What we claim as new and desire to secure by Letters Patent of the United States is:

1. In an inverter for producing three phase alternating current from direct current with first master and slave bistable circuits and second master and slave bistable circuits, said second master bistable circuit being slaved to said first master bistable circuit, a circuit for regulating said three phase alternating current comprising phase shift means coupled to said second master bistable circuit to shift the time of switching of said second master bistable circuit one-quarter cycle of said alternating current from the time of switching of said first bistable circuit; first means for controlling the time of switching between said first master and slave bistable circuits as a function of the relative magnitudes of the voltage between two of said phases and a reference voltage; second means for controlling the time of switching between said second master and slave bistable circuits as a function of the relative magnitudes of the voltage between two other of said phases and said reference voltage; and third means for controlling the time of switching between said first and second master bistable circuits about said one-quarter cycle point as a function of the relative magnitudes of the voltage between two other of said phases and a reference voltage.

2. In a system having two inverters whose outputs are coupled to produce a three phase alternating current output, said first inverter having a first master multivibrator that is switched at a predetermined rate and having a first slave multivibrator magnetically coupled to and switched by said first master multivibrator and said second inverter having a second master multivibrator magnetically coupled to and switched by said first master multivibrator and having a second slave multivibrator magnetically coupled to and switched by said second master multivibrator, a regulating circuit comprising phase shift means coupled to said second master multivibrator to shift the time of switching of said second master multivibrator one-quarter cycle of said alternating current from the time of swtiching of said first master multivibrator; first magnetic means coupled to the first and the third phases of said alternating current output for comparing the voltage magnitude therebetween with a first voltage magnitude; means coupling said first magnetic means to said first slave multivibrator for advancing and retarding said switching as a function of the relative magnitudes of said voltage between said first and third phases and said first voltage; second magnetic means coupled to the second and third phases for comparing the voltage magnitude therebetween with a second voltage magnitude; means coupling said second magnetic means to said second slave multivibrator for advancing and retarding said switching as a function of the relative magnitudes of said voltage between said second and third phases and said second voltage; third magnetic means coupled to the first and second phases for comparing the voltage magnitude therebetween with a third voltage magnitude; and means coupling said third magnetic means to said second master multivibrator for advancing and retarding said switching about said one-quarter cycle point as a function of the relative magnitudes of said voltage between said first and second phases and said third voltage.

3. In a system having two inverters coupled to produce a three phase alternating current output, the first inverter having a first master multivibrator and a first slave multivibrator coupled to and switched by said first master multivibrator and the second inverter having a second master multivibrator coupled to and switched by said first master multivibrator and a second slave multivibrator coupled to and switched by said second master multivibrator, a regulating circuit comprising phase shift means coupled to said second master multivibrator to retard the time of switching of said second master multivibrator one-quarter cycle of said alternating current from the time of switching of said first master multivibrator; first means coupled to the first and third output phases for comparing the voltage magnitude therebetween with a voltage; means coupling said first means to said first slave multivibrator for advancing and retarding said switching as a function of said first comparison; second means coupled to the second and third output phases for comparing the voltage magnitude therebetween with a voltage; means coupling said second means to said second slave multivibrator for advancing and retarding said switching as a function of said second comparison; third means coupled to the first and second output phases for comparing the voltage magnitude therebetween with a voltage; and means coupling said third means to said second master multivibrator for advancing and retarding said switching about said one-quarter cycle point as a function of said third comparison.

4. In a system having two inverters coupled to produce a three phase alternating current output, the first inverter having a first master bistable circuit and a first slave bistable circuit coupled to and switched by said first master bistable circuit and the second inverter having a second master bistable circuit coupled to and switched by said first master bistable circuit and a second slave bistable circuit coupled to and switched by said second master bistable circuit, a regulating circuit comprising phase shift means coupled to said second master bistable circuit to retard the time of switching of said second master bistable circuit one-quarter cycle of said alternating current from the time of switching of said first master bistable circuit; first means coupled to the first and third output phases for comparing the voltage magnitude therebetween with a reference voltage; means coupling said first means to said first slave bistable circuit for advancing and retarding said switching as a function of said first comparison; second means coupled to the second and third output phases for comparing the voltage magnitude therebetween with said reference voltage; means coupling said second means to said second slave bistable circuit for advancing and retarding said switching as a function of said second comparison; third means coupled to the first and second output phases for comparing the voltage magnitude therebetween with a voltage indicative of the voltage between the third phase and one other output phase; and means coupling said third means to said second master bistable circuit for advancing and retarding said switching about said one-quarter cycle point as a function of said third comparison.

References Cited

UNITED STATES PATENTS

| | | | |
|---|---|---|---|
| 2,575,600 | 11/1951 | Smith | 321—5 |
| 3,205,424 | 9/1965 | Bates | 321—18 |
| 3,248,639 | 4/1966 | Wellford | 321—45 |
| 3,271,654 | 9/1966 | Schlabach | 321—5 |
| 3,295,044 | 12/1966 | Pledger et al. | 321—5 |

JOHN F. COUCH, *Primary Examiner.*

W. H. BEHA, *Assistant Examiner.*